Feb. 18, 1969  G. C. NAPOLITANO  3,427,960
COMPACTING MACHINE

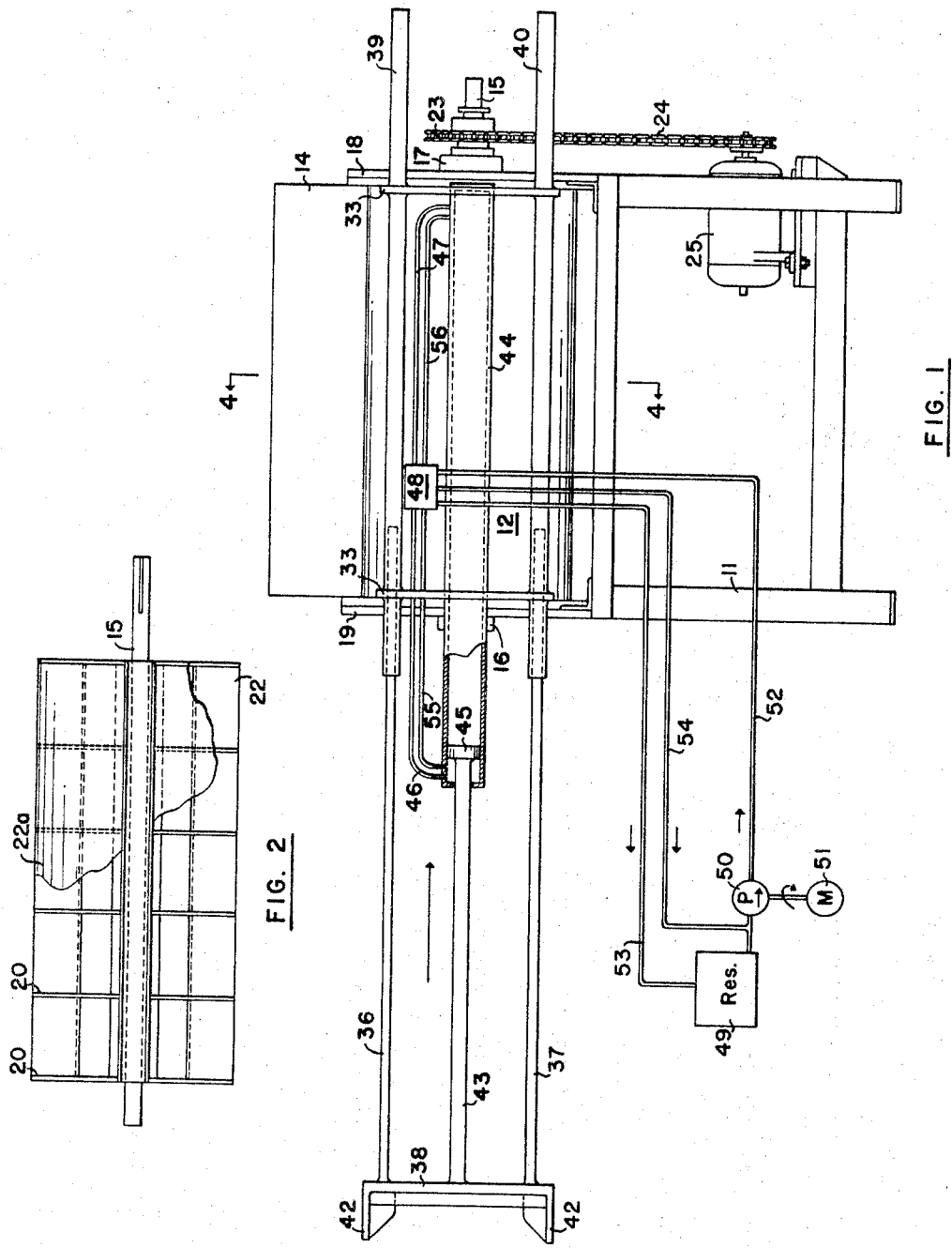

Filed April 21, 1966  Sheet 3 of 4

Feb. 18, 1969 G. C. NAPOLITANO 3,427,960
COMPACTING MACHINE

Filed April 21, 1966 Sheet 4 of 4

United States Patent Office 3,427,960
Patented Feb. 18, 1969

3,427,960
COMPACTING MACHINE
Guy C. Napolitano, San Francisco, Calif., assignor to Western Research and Scientific Laboratories, Inc., Berkeley, Calif.
Filed Apr. 21, 1966, Ser. No. 544,166
U.S. Cl. 100—218        11 Claims
Int. Cl. B30b 11/08; B65b 63/02

ABSTRACT OF THE DISCLOSURE

A machine for compacting friable material into cylindrical blocks, e.g., to form fire logs from sawdust and binder, including a drum having at least three compression chambers, each chamber being open at both ends and having an inlet opening toward the outside of the drum; a housing enclosing the chambers and mutually isolating them, the housing having an inlet passage with which the several chambers are successively brought into registry as the drum is rotated stepwise; and a reciprocable slide having (a) a compression ram and (b) an ejection plunger, both being fully retractable from the drum and movable to enter the chambers through an end opening. The drum is rotated in steps to bring each chamber in succession to a feed position, a compression position, and a discharge position, and the slide is reciprocated following each stepwise rotation, being movable only when the drum is stationary. When only one slide is used, the end of the chamber remote from the ram is closed at the compression position by a plate against which the friable material is compressed.

---

The invention relates to machines for compacting friable material into blocks, e.g., for producing pressed, combustible log-shaped objects sometimes known as pressed logs from loose material such as a mixture of sawdust and a liquid or flowable material such as wax that acts as a binder, or blocks of fertilizer containing agricultural fertilizing material and a binder, or feed blocks containing comestible ingredients that are inherently compactible to form cohesive rigid blocks or contain a separate binding agent.

Prior compacting machines for forming such comminuted material as sawdust into blocks or logs were costly because they required extremely high pressures to effect compaction of the sawdust to form a cohesive structure, Thus, in a commonly used method the sawdust was subjected to a high pressure sufficient to cause the rosin to be expressed for binding the dust particles. Also, such prior machines operated slowly. Although logs and blocks capable of being compacted at lower pressures can be formed in some known machines, these machines include needless complications incidental to confining the initial mixture under very high pressure. Hence a simpler and more economical machine would be useful for compacting certain types of materials.

The friable mixtures herein considered contain solids and a liquid ("liquid" being used herein to include flowable or semi-liquid materials) and the liquid may be largely or wholly absorbed by the solids. A specific example is sawdust to which wax at a temperature above its melting point is added in proportion to cause the resulting intimate mixture to contain from 20 to 60% of wax by weight.

It is desirable to provide a compaction machine that will receive friable material continually (i.e., to which the material can be charged as a continuous stream although the material enters the compaction machine intermittently), compress the material into blocks of reduced volume, typically from 20 to 70% of the initial bulk volume, and eject the cohesive blocks, all in rapid succession. The said cohesive blocks are hereinafter called "logs" and may, in some cases, be soft when first ejected but may harden upon a fall in temperatures and/or curing of the binding agent. This may occur after packaging the logs.

Further, it is desirable to produce compacted logs that have cross sections that are not circularly cylindrical, e.g., that have a face which is more or less flat or slightly of transversely concave shape, to facilitate stacking.

The principal object of the invention is to provide a machine having the capabilities stated in the preceding two paragraphs or in the first of these.

Ancillary objects attained by using some or all of the features to be described, are:

To attain a high operating speed by performing feeding, compression and ejection operations simultaneously on different logs, in progressive stages of completion, and/or by providing sufficient power to effect compression of the feed material at a high rate.

To attain a high operating speed by making the successive operations of the machine automatic insofar as the positioning of the several parts thereof are concerned and to provide interlocks, such as limit switches, that prevent the start of an operation before the preceding one has been completed.

To simplify the compacting machine so that it contains only a few parts and to reduce the cost of the machine.

To provide a plurality of compression chambers for the progressive, step-wise formation of the compacted logs, whereby one chamber can be situated at a feed station to receive the initial, friable material, another can be situated at a compression station whereat the material is compacted, and still another can be at a discharge station whereat the compacted log is discharged from the chamber, these three operations occurring simultaneously. Ancillary thereto, in an optional embodiment to be illustrated, a fourth compression chamber is provided so that a compacted log can be positioned at a waiting station, affording residence time for hardening or curing of the log prior to ejection, and at which the log may optionally be cooled, as by a blast of air.

Additional objects will become apparent from the following description.

In summary, the machine of the invention includes a rotatable drum, preferably mounted on a horizontal axis, having a plurality of at least three and, preferably, four compression chambers that are open at both ends and have inlet openings directed toward the drum periphery; a housing enclosing the drum and having a passage through which the feed material is charged into the compression chamber that is adjacent to said passage; ram means, such as a rod providing a piston at its end (or a pair of opposed rods providing mutually approaching pistons at their ends) for movement through a part of each chamber when at its compression position; and an ejection plunger movable through each chamber when it is situated at its discharge position for ejecting the compressed log.

In the preferred embodiment to be described, only one compression ram is used, said ram entering the chamber from one open end thereof, and the machine has an end plate which is situated at the other end of the chamber and is imperforate in the region adjacent to the compression position, the plate being close to the chamber so that the piston forces the material against the plate. The plate is of limited size or has an opening opposite the discharge position of the chambers for the passage of the compressed log (or for the passage of the ejection plunger into the chamber when the log is discharged in the direction away from the said end plate).

Also in the preferred embodiment, the compression ram and ejection plunger are both situated at the end of the drum remote from the said end plate and both are secured to a slide frame for movement in unison into and out of the compression chambers. A second end plate may be provided at the end of the housing near the slide frame to cover at least the end of the chamber at the feed position; when this plate extends over the full extent of the drum end, it is provided with openings for passage of the ram and plunger.

The said slide frame is preferably reciprocated by a drive providing high power at least in its inward stroke, such as a double-acting hydraulic cylinder and piston combination, whereby the compression ram and ejection rod move reasonably rapidly. The drum can be rotated by any suitable drive, such as a hydraulic or electric motor; because only little power is necessary to rotate the drum it can be conveniently turned by a small electric motor.

The drum drive is provided with means for stopping the rotation of the drum upon attaining a predetermined angular position at which each chamber is at its next station. Thus, the drum stops when each chamber in succession reaches the feed station (and, simultaneously, other chambers reach the compression and discharge stations), whereby the drum is intermittently rotated. Any suitable indexing means for stopping the rotation may be employed, such as cam means on the drum shaft mounted in cooperative relation to a controller, such as an electrical switch that controls the drum drive.

Further, the reciprocating movement of the slide frame that carries the compression ram and the ejection plunger is controlled by limit switches that automatically stop the movements of the frame and, if desired, initiate a reversing motion automatically after an inward stroke has been completed.

Finally, means are provided for interlocking the movements of the drum and slide frame so that the former cannot rotate except when the frame is retracted, with its compression and ejection plunger fully withdrawn from the compression chambers, and the slide frame cannot move toward the drum while the latter is rotating.

Having indicated the nature of the invention, reference is made to the accompanying drawings forming a part of this specification and showing by way of illustration two preferred embodiments, wherein:

FIGURE 1 is a rear elevation of the machine with the slide frame retracted, parts appearing in section;

FIGURE 2 is an elevation of the drum;

Figure 5:
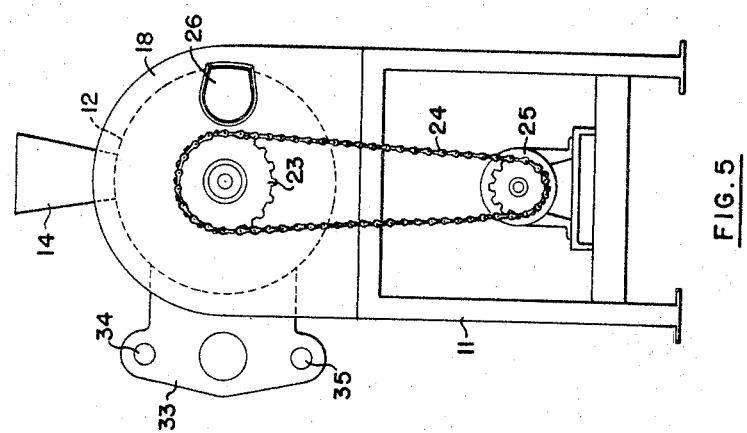
FIGURE 5 is a right side elevation of the machine, the bag holder, slide support rods and guide tubes being omitted.
Figure 4:
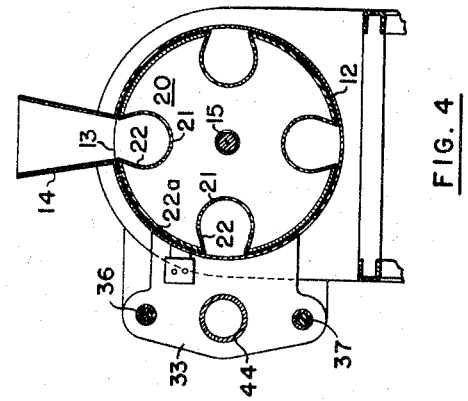
FIGURE 4 is a sectional view taken on the line 4—4 of FIGURE 1.
Figure 3:
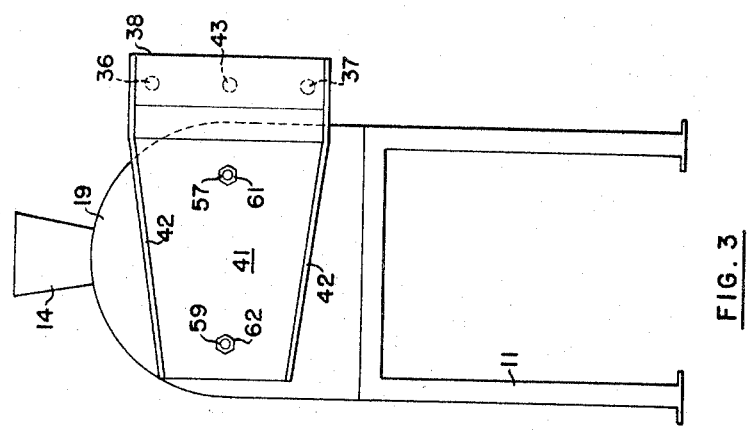
FIGURE 3 is a left side elevation of the machine.

Referring to the drawings in detail, FIGURES 1–7 show the compacting machine including a supporting base frame 11 on which is mounted a cylindrical housing 12 of circular internal cross section that is circumferentially imperforate save for a passage 13 near the top, preferably rectangular and as long as the housing. A longitudinally elongated funnel or hopper 14, forming a supply means for charging the friable material, extends upwards from the housing about the passage 13. The material can be supplied to the funnel continuously or intermittently by any suitable feeder. The housing contains a rotatable drum which includes a horizontal central shaft 15, journalled at 16 and 17 in end closure plates 18 and 19 of the housings, these plates being fixed to the housing by bolting or welding. The drum further includes (FIGURES 2 and 4) a plurality of transverse plates 20 of circular outlines, each said plate having a plurality of at least three, e.g., four recesses 21 extending inwardly from the periphery and of outwardly concave outlines, and situated at equal angular intervals. The recesses 21 of the several plates 20 are in axial alignment and each row receives a trough-shaped metallic wall 22 that defines, together with the housing 12, a compression chamber. Each chamber wall 22 extends through at least three-fourths of a circle, conveniently about 310–330° as shown, so that the longitudinal edges of the walls 22 lie in close proximity to, e.g., in or nearly in wiping engagement with the housing 12 as the drum rotates. Optionally, arcuate connecting walls 22a extend about the plates 20, joining the walls 22 of adjacent chambers. The trough-shaped compression chambers are open at their ends and their longitudinally extended openings between the said edges extend throughout the full lengths of the chambers, although this is not an absolute requirement. The said openings constitute inlets to the chambers and are preferably at least as large as the passage 13, so that the material can enter each chamber along its full length when its opening is in registry with the passage 13, i.e., when the chamber is in its feed position or station.

The shaft 15 carries a sprocket wheel 23 by which it is driven rotatably by a chain 24 from an electric motor 25 which is mounted on the frame 11. This motor is of a type suitable for intermittent operation and rapid stopping, e.g., it may be provided with electrical or mechanical braking means, and has a control circuit to be described. Suitable tensioning means for the chain 24 (not shown) may be provided.

The end plate 18 at the discharge end of the housing is situated in close proximity to the adjacent end of the chamber walls 22 and has a discharge opening 26 (FIGURE 5) at the discharge station, i.e., in axial alignment with the compression chamber which is situated in its discharge position. This opening is the same as or slightly larger than the cross sectional outline of the chamber, although a larger opening may be used. The other end plate 19 is situated in close proximity to the other ends of the chamber walls and has two openings 27 and 28 (FIGURE 7) that are situated, respectively, at the compression and discharge stations, i.e., in axial alignment with the compression chambers situated at the compression and discharge positions.

The shaft 15 carries indexing means, such as as many radial bars 29 as there are compression chambers, e.g., four in this embodiment, mounted on a collar 30 that is fixed to the shaft 15. These arms have bevelled ends that cooperate with idler wheel 31 on the pivoted operating arm of an electrical switch 32 carried by the end plate 19. The collar is oriented in relation to the idler wheel so that the switch 32 is actuated at each predetermined angular position of the drum at which the several compression chambers are in their next positions. Thus, as the drum rotates (clockwise as viewed from the left) the four compression chambers move successively through four positions, respectively the feed position opposite the feed passage 13, the compression position, a waiting position at the bottom of the housing, and the discharge position. These positions are, in this embodiment, situated at equal angular intervals of 90° apart. (The waiting position is not always necessary and, when not used, only three compression chambers and three stations, situated at 120° intervals, are provided; then only three bars 29 are used on the indexing means. Further, equal angular intervals, although greatly preferred, are not essential, but the angular intervals between the bars 29 should correspond to those between the chambers in the drum.)

Mounted on the frame 11 is a pair of brackets 33 that are fixed relatively to the housing and have upper and lower openings 34 and 35 for slidingly supporting upper and lower support rods 36 and 37, which are fixed to a slide frame 38. These rods may slide within guide tubes or pipes 39 and 40 that are fixed to the brackets 33 at said openings. The frame 38 extends vertically to engage the supporting rods 36 and 37 and includes a horizontal arm 41, suitably reinforced by upper and lower gusset plates 42, extending transversely across the machine. Attached to the slide frame is a piston rod 43 that extends parallel to and, preferably, midway between the rods 36 and 37, and enters a hydraulic cylinder 44 which is fixed to the brackets 33 and has suitable hydraulic fittings communicating with its ends. The rod 43 carries a piston or disc 45 at its end shaped to be actuable in both axial directions by hydraulic fluid admitted under pressure to one end or the other of the cylinder through ducts 46 and 47. The cylinder has a suitable end closure sealed to the rod 43. The ducts 46 and 47 extend to a solenoid-actuated control valve 48, herein called an idling by-pass valve, through which hydraulic fluid under pressure is supplied to one end or the other of the cylinder from a reservoir 49 by a pump 50 that is driven continuously by an electric motor 51. The pump 50 is connected to the valve 48 by a high-pressure duct 52. The idling by-pass valve 48 has means for returning fluid to the pump 50, e.g., a low-pressure return duct 53 leading to the reservoir and/or a by-pass duct 54 leading directly to the pump intake, although other hydraulic connections may be used. In some embodiments of the hydraulic system the ducts 46 and 47 transmit only hydraulic fluid at high pressure from the valve 48 to the ends of the cylinder 44, and additional low-pressure ducts 55 and 56 are provided to return the fluid expelled from the cylinder to the valve; in others the ducts 46 and 47 perform both functions. The details of such hydraulic connections and of the idling by-pass control valves are well known and are commercially available and are not, therefore, further described herein in detail. However, the overall functioning of the system is outlined in the next paragraph.

When the valve 48 is positioned in neutral, to effect no movement of the piston 45, fluid from the pump discharge duct 52 is returned to the pump suction via the duct 54 (and/or returned via the duct 53 to the reservoir). When the valve 48 is positioned to cause movement of the piston 45 toward the right (from the position shown in FIGURE 6), herein called its first position, the pump discharge fluid is directed into the duct 46 to cause flow into one end of the cylinder 44, and the duct 56 is connected to discharge fluid from the other end of the cylinder into the reservoir through the duct 53 (and/or to the pump intake via the duct 54). When the valve 48 is positioned to cause movement of the piston toward the left, herein called its second position, the pump discharge fluid is directed into the pressure duct 47 and, thereby, to the other end of the cylinder 44, and the duct 55 is connected to discharge fluid into the reservoir (and/or the pump intake via the duct 54). The solenoid valve 48, therefore, has three positions or conditions, respectively neutral, first and second. The valve 48 is controlled by an electrical circuit to be described, which includes limit switches that are preferably interlocked with the indexing switch 32.

The slide frame 38 has rigidly attached thereto a compression rod 57 that is aligned with the opening 27 in the end plate 19, of length to enter the compression chamber situated at the compression position and to effect the desired movement therein. The end of this rod may be enlarged to provide a piston 58 that may have a cross sectional outline to fit closely within the compression chamber, engaging the wall 22 and the housing 12. However, it was found that it is not, with many materials, essential that this piston have a snug fit with the chamber walls and housing. Hence, this piston may be of any desired, e.g., circular, outline. (An alternative construction of the piston and chamber is described hereinafter in connection with FIGURES 9 and 10.) Also rigidly attached to the frame 38 is an ejection rod 59 that is aligned with the opening 28 to enter the compression chamber that is situated at the discharge position. It may carry an enlarged head 60, of outline to pass through the compression chamber, pushing the compacted log ahead of it. The rods 57 and 59 thereby move in unison when the slide moves toward the right from the position of FIGURE 6, and their lengths are different as shown, such that the piston 58 compresses the material in the compression chamber to a desired reduced length, e.g., between 0.2 and 0.6 of the original or chamber length, without significant change in cross section while the head 60 ejects a compressed log. In some situations the stroke of the piston 58 within the chamber is even larger, to attain a shorter ultimate length of the log, as when the longitudinal extent of the inlet passage 13 or that of the inlet opening between the edges of the walls 22 is shorter than the full length of the chambers, so that these chambers are not initially completely filled with loose material.

The rods 57 and 59 may be threadedly connected to the slide frame 38 to permit adjustment of their strokes within the compression chambers, and secured by lock nuts 61, 62. Thereby the degree of compression can be adjusted, it being understood that the piston heads 58 and 60 are always fully retracted from the compression chambers when in their left-most positions shown in FIGURE 6, and that the head 60 moves entirely through or through most of the chamber in the discharge position to permit the compacted log to be expelled from the drum.

Figure 6:
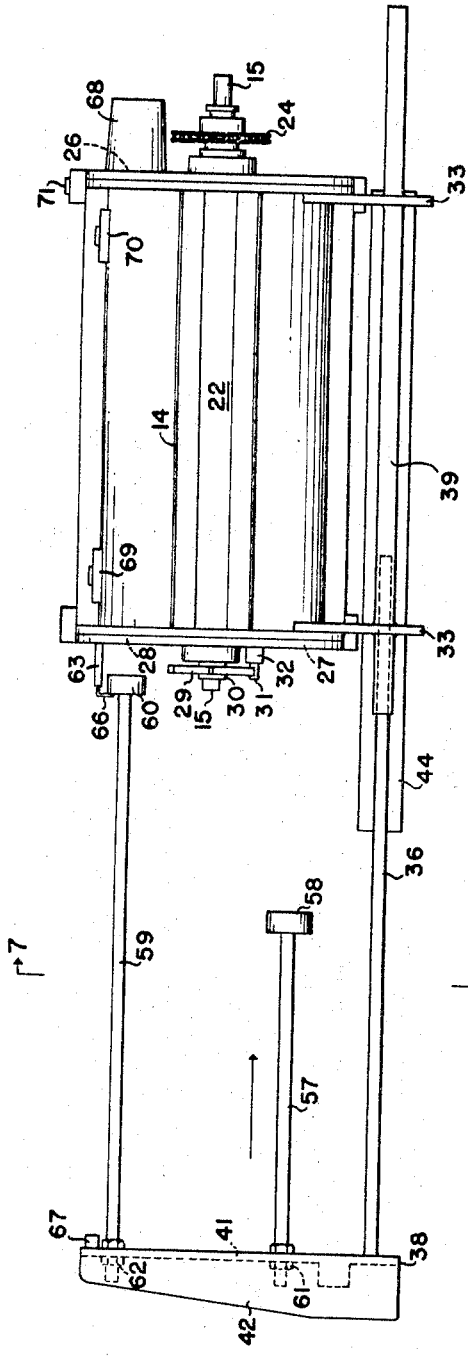
FIGURE 6 is a plan view of the machine, the front appearing at the top of the view.
Figure 7:
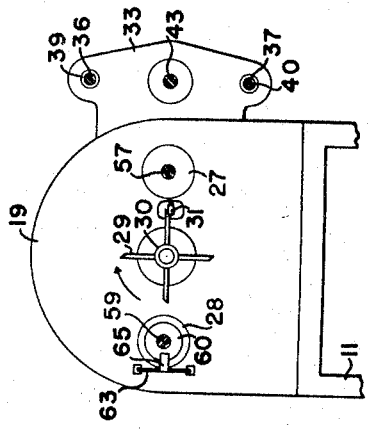
FIGURE 7 is a sectional view taken on the line 7—7 of FIGURE 6.

The reciprocating movement of the slide frame 38 is regulated by suitable position-sensitive devices, such as limit switches actuated by abutments when the slide frame is in either extreme position. These switches may be combined into a dual limit switch 63 (FIGURES 6 and 7) mounted on the housing plate 19. This switch includes two separate sections 64 and 65 (indicated only in FIGURE 8) that are actuated by an axially movable feeler 66. The slide frame carries an abutment 67 that engages the feeler to push toward the right (as shown in FIGURE 6) when the frame is moving into its extreme right position. The feeler is resiliently returned to its center position when the slide moves toward the left from its extreme right position. The feeler is pulled to the left of its center poistion when engaged by the head 60 when the frame is moving to its extreme left position, and is resiliently returned to its center position when the slide moves toward the right from its extreme left position. The switch combination controls the actuation of the solenoid valve 48, as will appear, and preferably also selectively permits operation of the motor 25.

The end plate 18 carries a tubular bag holder or "duck bill" 68 mounted about the opening 26 and preferably having a more or less circular cross section (or one shaped like the opening 26); it is externally tapered convergently away from said plate to permit a paper bag to be placed over it with its open end toward the plate. Thereby a compressed log ejected by the rod 59 is pushed through the holder into the bag, the holder being shorter than the bag and than the log so that a part of the log projects beyond the holder and can be grasped by the operator and pulled out together with the bag.

The machine further carries a pair of normally open drum-control push button switches 69 and 70 which are connected in series. Although a single switch can be used to initiate rotation of the drum, it is preferred to use these two switches and to locate them far enough apart to make it necessary for the operator standing in front of the machine to use both hands to depress the switch buttons simultaneously. Thereby the operator cannot initiate a rotary movement of the drum while one of his hands is inserted into the passage 13. A normally open slide frame-control push button switch 71 is mounted near the bag holder. Additional switches, to be described in connection with FIGURE 8, are provided.

Figure 8:
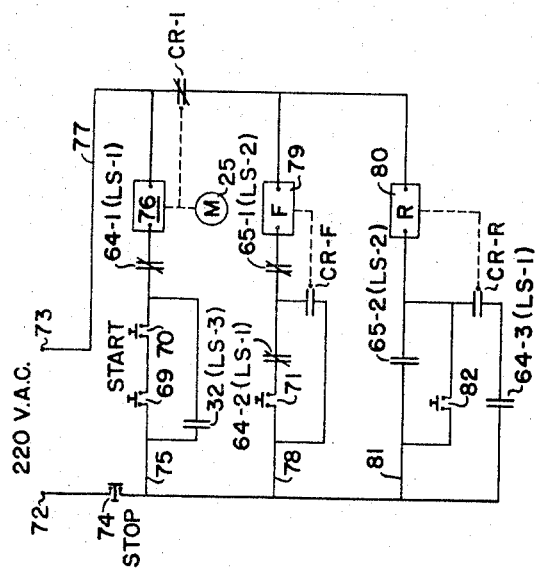
FIGURE 8 is a schematic circuit diagram of the power control elements and the limit switches.

FIGURE 8 shows a simplified form of a control circuit for controlling the operations of the drum and slide frame and providing interlocks, it being understood that even simpler circuits or more elaborate circuits can be used to effect fully automatic operation. These variations being within the skill of an electrician and not essential to the operation, are not further described.

In the following description certain switches are said to be normally open or normally closed. Wherever used, the "normal" condition is that of the limit switches LS–1 and LS–2 when the slide frame is fully retracted as shown (with the feeler 66 engaged to the head 60); of the limit switch LS–3 when the switch 32 is actuated by one of the arms 29 of the indexing means (with the drum positioned as shown); and of the solenoid-controlled switches CR–1, CR–F and CR–R when the respective circuit elements that control them are not energized.

Further, as previously mentioned, the dual limit switch 63 includes two independent switches 64 and 65, both being multisection and actuated by the feeler 66. Switch 64 includes three sections, of which two, 64–1 and 64–2, are closed when the slide frame is in its extreme outer position and open when the feeler is disengaged from the head 60; the third section, 64–3, is open when the first sections are closed and vice versa. These switches are all part of LS–1. The switch 65, called LS–2, includes two sections, of which 65–1 is closed except when the feeler 66 is pushed in by the abutment 67, and the section 65–2 is open when the first is closed and vice versa. It is understood that the switches LS–1, LS–2 and LS–3 may be the actual switches identified by numbers and mounted on the machine, or may be relay switches connected to be operated in accordance with the positions of the switches on the machine.

Referring to FIGURE 8 in detail, the control circuit includes terminals 72, 73, connected to a source of electric power, such as 220 v. A.C. The former is connected through a normally closed STOP switch 74 to three branches as follows:

(1) A drum-actuation circuit 75 which includes, in series, the normally open push button switches 69 and 70, a normally closed section 64–1 of LS–1 and a motor control unit 76, and is further connected to the terminal 73 by a circuit 77. The first two switches are shunted by the normally open indexing switch 32 (LS–3). The unit 76 includes means to apply power to the motor 25 when the unit is energized and to brake the motor when not energized, the control function being indicated by the dashed line. Further, the unit 76 emits a voltage to open a normally closed relay CR–1 when the unit 76 is energized. The relay has one side connected to the circuit 77.

(2) The forward slide frame-actuation circuit 78 includes, in series, the switch 71, a normally closed section 64–2 of LS–1, the normally closed section 65–1 of LS–2, the forward solenoid 79 of the idling by-pass valve 48, and is connected to the other side of the relay CR–1. When the unit 79 is energized it closes a normally open control relay CR–F which is connected in shunt with the switches 71 and 64–2. It may be noted that the valve 48 includes the forward solenoid unit 79 and a reverse solenoid unit 80 and assumes its first and second positions, respectively (as previously defined) when the unit 79 or the unit 80 is energized; when neither is energized the valve 48 is in its neutral position.

(3) The reverse slide frame-actuation circuit 81 includes, in series, the normally open section 65–2 of LS–2 and the reverse unit 80 of the valve 48, and is connected to the said other side of CR–1. When the unit 80 is energized it closes a normally open control relay CR–R which is connected in series with the normally open section 64–3 of LS–1, the elements CR–R and 64–3 being connected in shunt with the element 65–2. Optionally, there may be provided a manually operable, normally open push button switch 82, connected in parallel with the switch 65–2.

Operation of the control circuit is as follows: When both of the switches 69 and 70 are closed for a short time, power is applied to the control unit 76, provided that the switch 64–1 is closed, i.e., that the frame is fully retracted. This opens CR–1, preventing energization of the valve 48 by either unit 79 or 80 and insuring that it remains in neutral. This further energizes the motor 25 to turn the drum, until stopped by its indexing means. When the drum starts to turn, the indexing switch 32 closes, thereby causing power to remain on after release of the switches 69 and 70. When the predetermined angular position of the drum is reached the switch 32 opens, thereby de-energizing the unit 76 and stopping the motor 25.

Closing the switch 71 for a short time applies power to the solenoid unit 79 through the closed switches 64–2, 65–1 and CR–1, causing the valve 48 to operate and assume its first position to admit hydraulic fluid under pressure through the duct 46 to move the slide frame inwards. Soon after this movement starts the switch 64–2 opens, but power remains applied to the unit 79 because switch CR–F was closed when the unit 79 became energized. At the end of the inward travel of the frame the switch 65–1 opens, thereby interrupting power to the unit 79 and releasing the valve 48 to move from its first position; de-energization also opens the switch CR–F.

Simultaneously with the opening of switch 65–1, the switch 65–2 closes, thereby energizing the solenoid unit 80 and placing the valve 48 into its second position, to admit hydraulic fluid under pressure through the duct 47 to move the slide frame outwards. Soon after this reverse movement starts the switch 65–2 opens, but power remains applied because the switch CR–R was closed by the unit 80 and the switch 64–3 was closed when the frame first left its extreme outer position. When the retraction stroke is completed the switch 64–3 opens, thereby interrupting power to the unit 80 and causing the valve 48 to assume its neutral position.

The manual switch 82, when provided, may be used to effect reverse movement of the frame prior to completing an inward stroke.

The compacting machine as a whole operates as follows: The friable material, e.g., a mixture of sawdust and molten wax, at a temperature above the melting point of the wax, optionally containing additives such as an additional binding agent and/or an oxygen donor to support combustion, is supplied by a conveyor through the funnel 14 and falls by gravity into the compression chamber that is in its feed position, beneath the passage 13. The operator can look down through the hopper and manually aid the entry of the material into the chamber. When the desired charge has entered the chamber the operator depresses both push button switches 69 and 70, causing the motor 25 to rotate the drum until stopped by the indexing switch 32 with the said compression chamber situated at the compression position. During this rotation material in the hopper 14 is prevented from falling through the passage 13 by the arcuate connecting walls 22a, when provided; when these walls are not provided, charging of material into the hopper is interrupted during rotation of the drum. In this instance the feeder may supply a predetermined quantity of material to the hopper 14 for each charge, and all of the said quantity is supplied to the compression chamber.

The operator then closes the switch 71, causing the valve 48 to assume its first position and move the slide frame 38 and rod 57 toward the right. The piston 58 thereby compresses the friable material within the compression chamber against the end wall 18. When the abutment 67 operates the limit switch 63 at the end of the inward travel of the frame, the valve 48 is moved to its second position and the frame, rod and piston move toward the left. This retraction stroke is completed when the feeler 66 is engaged by the head 60, the valve 48 being thereby brought to its neutral position. (The details of these functions were described above, in connection with the control circuit.) During this reciprocation of the frame the next (second) compression chamber is filled with friable material. When the frame reciprocation and filling operation are completed, the switches 69 and 70 are again operated to advance the drum another step. This brings the compacted log to the waiting station, and the material in the second compression chamber is compacted.

The third reciprocation having been completed and the third compression chamber filled, the drum is advanced another step, bringing the log in the first-mentioned chamber to the discharge station. Now when the switch 71 is closed the movement of the slide frame produces two simultaneous actions: The log at the discharge position is ejected by the rod 59 and its head 60 through the opening 26 and through the bag holder 68 into a paper bag that was previously placed over this holder; and the material in the third compression chamber is compacted, by the piston 58. The ejected log and wrapping are then withdrawn manually.

During the next rotation of the drum the first-mentioned compression chamber is again brought to the feed position. In the subsequent reciprocations of the slide frame compaction and ejection of different logs occur simultaneously while a third chamber is being filled. Thus, at each quarter rotation of the drum a new compression chamber is placed into each position. Hence there results simultaneous feeding, compaction and ejection. Further, when four chambers are provided, a compressed log is within the chamber in the waiting position, in readiness to move into the discharge position and, in some cases, undergoing partial or complete curing. Thereby a residence time prior to ejection is provided.

Figure 9:
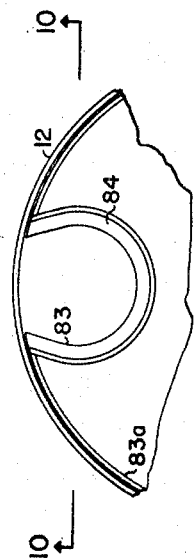
FIGURE 9 is an end view of a modified embodiment of the drum, viewed from the end nearer the slide frame.
Figure 10:
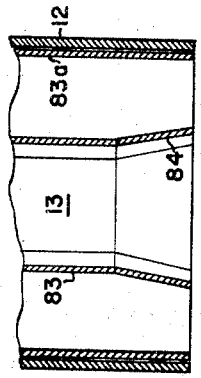
FIGURE 10 is a sectional view taken on the line 10—10 of FIGURE 9, showing the shape of the compression chamber wall, the compression ram being additionally shown.

FIGURES 9 and 10 show a modified construction in which each compression chamber is formed of a wall 83 that is of uniform cross section throughout most of its length but is flared slightly at the end toward the slide frame, as appears at 84, to provide an enlarged inlet. This facilitates entry of the piston 58 into the compression chamber and is especially useful when this piston has a shape to fit closely against the walls bounding the chamber. This shape would require very precise alignment of the rod 57 with the chamber were it not flared. The drum may, as in the first embodiment, include arcuate walls 83a extending circumferentially between the edges of the walls 83 of adjacent chambers and fitting closely within the housing 12, which has a passage 13 as previously described.

I claim as my invention:

1. Machine for compacting friable material into cylindrical blocks, comprising:
   (a) a drum mounted for rotation on a generally horizontal longitudinal axis and providing at least three longitudinal compression chambers that are open at both ends and have individual inlet openings directed outwardly toward the periphery of the drum,
   (b) a housing enclosing peripherally in close relation at least the portions of the drum that contain said inlet openings for closing said chambers laterally and isolating the chambers from each other, said housing having an inlet passage situated for registry successively with the inlet opening in each of said chambers at successive angular positions of the drum,
   (c) supply means connected to said housing at said passage for supplying friable material thereto,
   (d) means for rotating said drum in steps to bring each chamber successively to a feed position opposite the said passage in the housing, a compression position, and a discharge position and for stopping the rotary motion at each of said positions,
   (e) ram means for compressing the material within each chamber when the respective chamber is in the compression position, said means including a piston which is fully retractable from the drum and is movable longitudinally from outside each chamber through an open end thereof into and within the chamber only when rotation of the drum is stopped, and
   (f) ejection plunger means including a plunger which is fully retractable from the drum and is movable longitudinally from outside each chamber through one open end thereof into the chamber only when rotation of the drum is stopped for pushing the compressed material longitudinally from each of said compression chambers through the other open end thereof when the respective chamber is in the discharge position.

2. A compacting machine as defined in claim 1 wherein said passage is situated in an upper part of the housing and said supply means extends upwardly therefrom for entry of the friable material into the compression chambers by gravity.

3. A compacting machine as defined in claim 1 wherein said inlet openings of the compression chambers extend throughout the full lengths of the chambers and said passage in the housing has a length equal to substantially the full lengths of the chambers.

4. A machine as defined in claim 1 wherein:
   (a) said drum comprises a plurality of plates of generally circular outline mounted rigidly on and perpendicularly to a central drive shaft that is journalled for rotation within the housing, each said plate having a series of concave recesses extending inwardly from the periphery, the periphery of each plate being situated near the housing and the recesses on the several plates being in longitudinal alignment, and
   (b) said compression chambers are formed of troughs extending at least through three-quarters of a circle and being open toward the outside of the drum to provide the inlet openings, each trough being rigidly mounted within a series of said recesses within the plates and the portions of said troughs which adjoin the said openings being in close proximity to the housing.

5. A compacting machine as defined in claim 1 wherein:
   (a) said drum comprises a central drive shaft journalled for rotation within the housing and being drivingly connected to power means for effecting rotation thereof,
   (b) said shaft having cam means cooperatively associated with circuit control means for actuating the latter at predetermined angular positions of the shaft corresponding to alignment of said compression chambers with said positions thereof, and
   (c) said circuit control means being connected to said power means to stop the rotation of the shaft upon arriving successively at each of said angular positions.

6. A compacting machine as defined in claim 1 wherein said drum has four chambers and the means for rotating the drum includes indexing means for turning the drum in steps of 90° so as to position the chambers successively at the three positions specified and a waiting position situated between the compression and discharge positions.

7. A compacting machine as defined in claim 1 wherein said housing comprises at one end thereof an end plate that is positioned close to the adjacent ends of said compression chambers and is imperforate opposite the compression position, said plate having an opening opposite the discharge position.

8. A compacting machine as defined in claim 7 wherein said housing includes, additionally, a second end plate at the other end thereof that is positioned close to the other ends of said compression chambers and has a pair of openings for registry with said chambers when in the compression and the discharge positions, respectively, for the passage of said piston through the former and said ejection plunger means through the latter, the said second plate being imperforate opposite the feed position.

9. A compacting machine as defined in claim 1 wherein said ram means and ejection plunger means comprise:
 (a) a slide frame mounted on said housing for longitudinal reciprocating motion relatively to said drum,
 (b) said ram means comprises a rod providing said piston at the end thereof and mounted at the other end thereof to said frame in alignment with each chamber when in the compression position,
 (c) said ejection plunger means comprises an ejection rod mounted on said frame in alignment with each chamber when in the discharge position, and
 (d) power means for reciprocating said slide frame.

10. The compacting machine as defined in claim 9 wherein said means for rotating the drum includes:
 (a) power-driven means for imparting rotation to the drum,
 (b) means for stopping the rotation of the drum after a predetermined angular rotation thereof such as to bring each chamber into the next position thereof, and
 (c) the machine further includes means for preventing
   (1) rotation of the drum while the said slide frame is in any position except retracted away from the drum with said piston and ejection rod withdrawn from the compression chambers, and
   (2) reciprocation of said slide frame while the drum is rotating.

11. A compacting machine as defined in claim 9 wherein:
 (a) said power means for reciprocating the slide frame includes a double-acting hydraulic cylinder and piston combination and means for supplying hydraulic fluid under pressure thereto, and
 (b) said means for imparting rotation to the drum includes an electric motor drivingly connected to the drum and having a control circuit for causing intermittent operation thereof.

References Cited

UNITED STATES PATENTS

| | | | |
|---|---|---|---|
| 737,425 | 8/1903 | Laernoes et al. | 100—218 |
| 1,855,221 | 4/1932 | Burkholder et al. | 100—218 |
| 3,009,413 | 11/1961 | Alexander et al. | 100—218 |
| 3,040,654 | 6/1962 | Opie | 53—124 X |
| 3,213,784 | 10/1965 | Bornzin | 100—139 |
| 3,339,335 | 9/1967 | Bowden | 53—123 |
| 2,379,371 | 6/1945 | Moschel et al. | 56—502 X |

FOREIGN PATENTS

| | | |
|---|---|---|
| 1,043,441 | 9/1966 | Great Britain. |
| 444,502 | 1/1949 | Italy. |

TRAVIC S. McGEHEE, *Primary Examiner.*

R. L. FARRIS, *Assistant Examiner.*

U.S. Cl. X.R.

100—269; 53—124; 44—13